United States Patent [19]

Klein

[11] 4,239,122

[45] Dec. 16, 1980

[54] REINFORCED STORAGE RACK

[75] Inventor: Herbert H. Klein, Arlington Heights, Ill.

[73] Assignee: Unarco Industries, Inc., Chicago, Ill.

[21] Appl. No.: 882,733

[22] Filed: Mar. 2, 1978

[51] Int. Cl.³ .............................. A47F 5/00
[52] U.S. Cl. ........................ 211/182; 52/727; 211/191
[58] Field of Search .............. 211/182, 183, 191, 189; 52/727, 728, 730

[56] References Cited

U.S. PATENT DOCUMENTS

| | | | |
|---|---|---|---|
| 514,233 | 2/1894 | Kubach | 52/727 X |
| 2,821,941 | 2/1958 | Reed | 52/727 X |
| 3,082,490 | 3/1963 | Loucks | 52/727 |
| 3,451,319 | 6/1969 | Gubela | 52/727 X |
| 3,470,666 | 10/1969 | Mod et al. | 52/727 X |
| 3,815,285 | 6/1974 | Kuyper | 52/727 X |

FOREIGN PATENT DOCUMENTS

| | | | |
|---|---|---|---|
| 253162 | 3/1967 | Austria | 211/191 |
| 2103108 | 7/1972 | Fed. Rep. of Germany | 52/727 |
| 554340 | 6/1943 | United Kingdom | 52/727 |

*Primary Examiner*—Roy D. Frazier
*Assistant Examiner*—Robert W. Gibson, Jr.
*Attorney, Agent, or Firm*—Clement and Ryan

[57] ABSTRACT

A reinforced storage rack for substantially resisting forklift impact, bending and deflection. The reinforced rack has a plurality of composite post assemblies each including a metal post and an impact-resistant wooden core. Desirably, the reinforced rack also has a plurality of generally horizontal composite beam assemblies each of which include a metal beam and a deflection-resistant wooden core.

18 Claims, 11 Drawing Figures

FIG. 2
PRIOR ART
FIG. 3
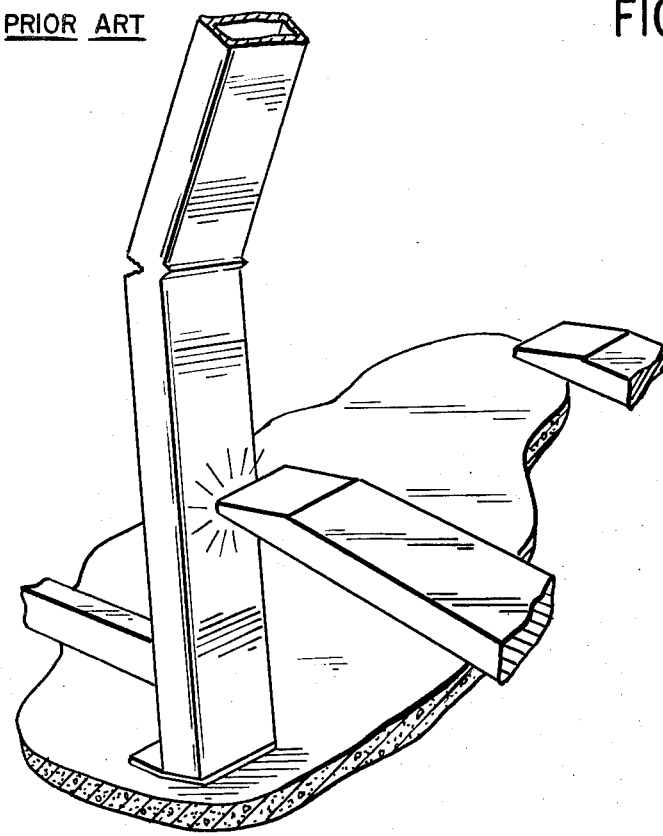
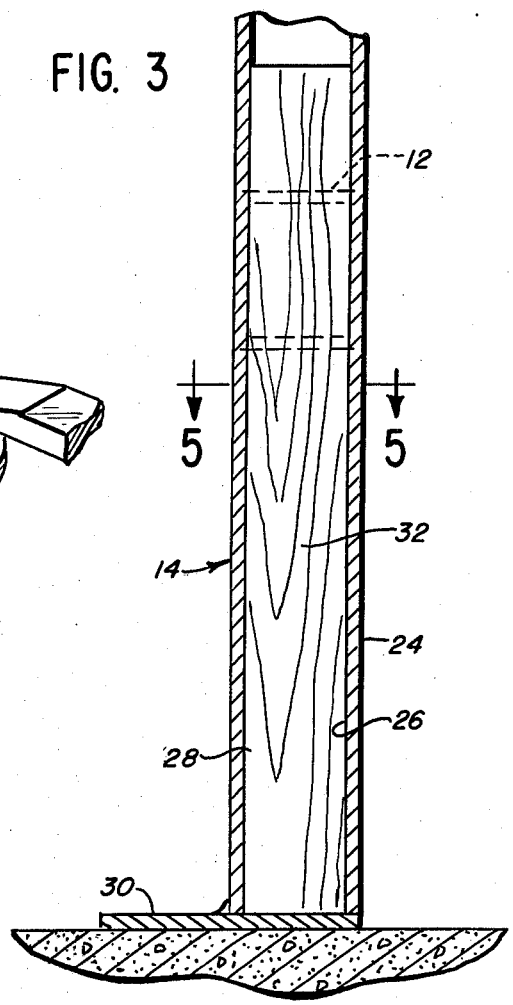
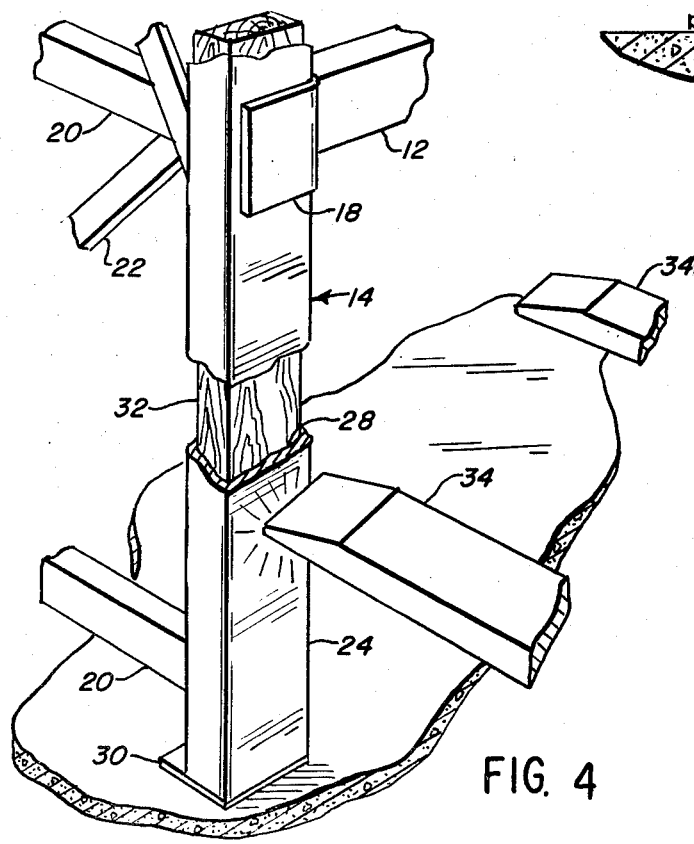
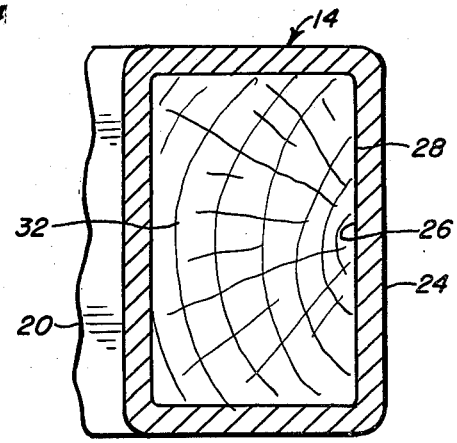
FIG. 4
FIG. 5

REINFORCED STORAGE RACK

BACKGROUND OF THE INVENTION

This invention relates to storage racks, and more particularly, to a reinforced storage rack.

Conventional upright posts and horizontal beams in storage racks are typically made of metal, such as steel, and are hollow for reasons of economy. The storage racks are usually utilized to support loaded pallets or other articles upon its horizontal beams. Such pallets are normally inserted and removed by forklift trucks. Occasionally, the front or back of a forklift truck accidentally strikes one or more of the posts of the storage rack, causing the post to bend and kink at a position slightly below the connection of the beam to the post or at the point of impact.

Excessive or continuous bending and kinking of a post can cause the storage rack to become unstable and possibly tip over, or even collapse, creating a potentially hazardous condition.

On other occasions, the weight of the loaded pallets may be greater than the load-carrying capacity of the beams, causing the beams to deflect or bow downwardly at an excessive amount. Such conditions may undesirably interfere with the amount of usable storage space below the beams and may cause the storage rack to become unstable. Furthermore, excessive beam deflection may cause the load to tumble or tip creating damage to the load and presenting a potential safety hazard to personnel. Moreover, excessive bowing of a beam may prevent the tines of the forklift truck from becoming aligned with the pallet, which is supported on the beam, making removal of the loaded pallet by forklift trucks difficult, if not impossible. This creates a very undesirable situation.

Solving these problems by using solid steel beams and posts to provide stronger support members is very expensive and economically prohibitive for most manufacturers and customers. Utilizing hollow beams and posts with larger outer dimensions and cross-sections reduces the overall load-carrying capacity and storage space of the rack.

In an effort to solve the problem of forklift impact, some prior art posts have been constructed with external protectors, post-guards and shields made of metal or wood, while other types of prior art posts have been reinforced with an internal metal angle along one side. These prior art posts have met with varying degrees of success.

To prevent debris, such as foodstuff and other comestible material, from accumulating within the interior of a hollow post, which might otherwise undesirably attract rodents and insects, particularly in grocery warehouses, some prior art posts have been filled with plastic foam. While these prior art posts have been beneficial for preventing debris accumulation, they do not effectively eliminate the problems of forklift impact as described above.

It is therefore desirable to construct a storage rack which is economical and substantially resists forklift impact, bending and deflection without interfering with the overall load-carrying capacity and storage space of the rack.

SUMMARY OF THE INVENTION

A reinforced storage rack is provided with composite load-carrying post and beam assemblies to substantially resist forklift impact, bending and deflection. The load-carrying post and beam assemblies are economical and are constructed and arranged so as to avoid substantially interfering with the load-carrying capacity and storage space of the reinforced storage rack.

Each load-carrying post or beam assembly has an elongated generally tubular metal support member, such as a post or beam, with an interior wall defining a core-receiving opening. An impact or deflection-resistant interior wooden core is disposed within the core-receiving opening. The wooden core and its associated metal post or beam cooperate with each other and have a combined strength substantially greater than the strength of the metal post or beam alone.

Preferably, the wooden core substantially spans across the core-receiving opening and is fixedly secured to the interior wall of the post or beam, such as by press-fitting the wooden core into the post or beam, or vice versa.

In the illustrative embodiment the wooden core consists substantially of hardwood and is solid. Desirably, the wooden core is selected from a class of hardwoods consisting of oak, elm, gum and tupelo.

In one embodiment the deflection-resistant core extends about two-thirds the length of the beam generally about the vertical center line of the beam.

In another embodiment the deflection-resistant core extends substantially along the entire length of the beam.

Preferably, the tubular post and beam are imperforate and at least partly circumscribe the core-receiving opening. The posts and beams can have a rectangular cross-sectional configuration, or can be channel-shaped. Other cross-sectional configurations can be used if desired.

A more detailed explanation of the invention is provided in the following description and appended claims taken in conjunction with the accompanying drawings.

BRIEF DESCRIPTION OF THE DRAWINGS

FIG. 2 is a fragmentary perspective view of a prior art post upon impact by a forklift truck;

FIG. 3 is a fragmentary cross-sectional side view of a composite post assembly in accordance with principles of the present invention;

FIG. 4 is a fragmentary perspective view of the composite post assembly upon impact by a forklift truck and showing portions broken away for ease of understanding and clarity;

FIG. 5 is a cross-sectional top view of the composite post assembly taken substantially along line 5—5 of FIG. 3;

DETAILED DESCRIPTION OF THE ILLUSTRATIVE EMBODIMENT

Figure 1:
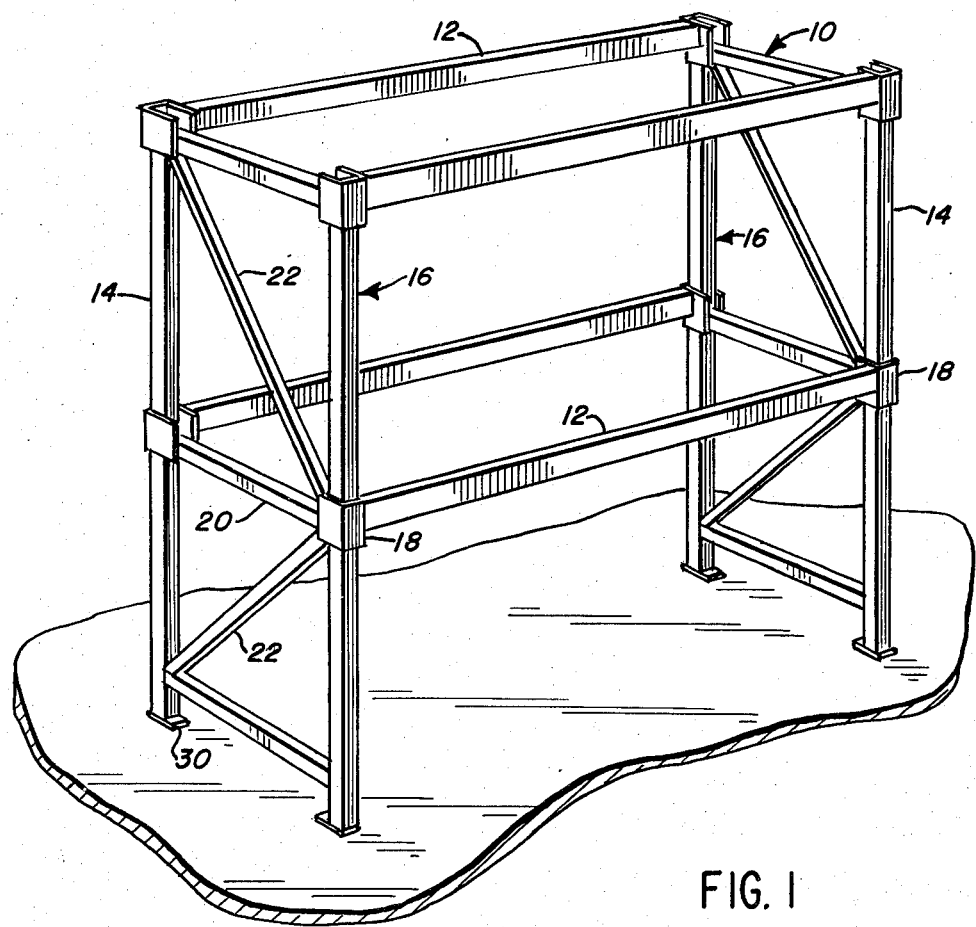
FIG. 1 is a perspective view of a reinforced storage rack in accordance with principles of the present invention.

FIG. 1 of the drawings illustrate a reinforced storage rack 10 which is particularly useful for supporting load-carrying pallets, which are inserted and removed from the reinforced storage rack 10 via a forklift truck. The storage rack 10 can also be useful for carrying other articles and loads.

The reinforced storage rack 10 has a plurality of generally horizontal, composite load-carrying beam assemblies or support bar assemblies 12 that are connected to a plurality of upright composite load-carrying post or column assemblies 14 of upright frames 16 via one or more connectors or connecting devices 18. Each upright frame 16 has a plurality of horizontal crossbars 20, extending transversely between and interconnecting a pair of post assemblies 14, and one or more diagonal braces 22 connecting the crossbars 20 to provide additional lateral support for the storage rack 10. In some circumstances it may also be desirable to mount supplementary horizontal crossbars, or a metal deck or fork entry bars upon the beam assemblies 12 to provide further support for the load.

As shown in FIGS. 3–5, each composite post assembly 14 has an elongated generally tubular upright post, support member or hollow column 24 which is made of metal, such as steel. Other types of metal can also be used. Tubular post 24 has an interior wall 26 which defines and at least partially circumscribes a core-receiving opening 28. The bottom of the post 24 has a base plate 30 which is anchored to the floor of the warehouse by suitable fasteners, such as anchor bolts.

In the embodiment shown in FIGS. 3–5, the post 24 has a rectangular cross-sectional configuration and completely circumscribes and vertically surrounds the core-receiving opening 28. While a post having a rectangular or annular cross-sectional configuration is preferred, it may be desirable in some circumstances to use other cross-sectional configurations and shapes.

Desirably, post 24 is imperforate for ease of cleanliness. In some circumstances, however, it may be desirable that the post be slotted or perforated with holes.

In order to reinforce the post 24, an impact-resistant interior wooden core is disposed within the core-receiving opening 28. Preferably, the impact-resistant wooden core is substantially solid and spans across the core-receiving opening 28. Desirably, the impact-resistant wooden core 32 also is fixedly secured to the interior wall 26 of the post 24, such as by press fitting the core 32 into the post 24 or vice versa.

In the preferred embodiment, the impact-resistant wooden core 32 extends upwardly from a position adjacent the base plate 30 in proximity to the ground, to a position above the connector 18 associated with the first level or tier of beam assemblies 12 as best shown in FIG. 4. Preferably, the impact-resistant core is selected from the class of hardwoods consisting of oak, elm, gum and tupelo.

Impact-resistant core 32 and metal post 24 are cooperatively associated with each other and have a combined strength substantially greater than the strength of the metal post 24 alone to substantially resist forklift impact, bending and kinking. The composite post assembly 14 may also be beneficial to prevent buckling and bending due to excessive loads upon the beam assemblies 12.

One type of composite post assembly 12 that can be used with this invention is a 3×2½ inch post made of 12–14 gauge steel (i.e., a steel post having a rectangular cross-section with a 3 inch outer face and a 2½ inch end face). The first or lower level of the beam assemblies 12 can be located about 8 feet above the floor and the impact-resistant core 32 can extend from a position adjacent the base plate 30 to about 1 foot above the intersection of the first level beam assemblies 12 and the post 24. Composite post assemblies 14 and reinforced storage racks 10 having other dimensions can be used.

In use, the composite post assembly 14 will not bend or kink excessively if accidentally struck by the tines 34 or back of a forklift truck (FIG. 4) and thereby substantially prevents the potentially dangerous situation that can occur with some prior art posts (FIG. 2).

Figures 6, 9:
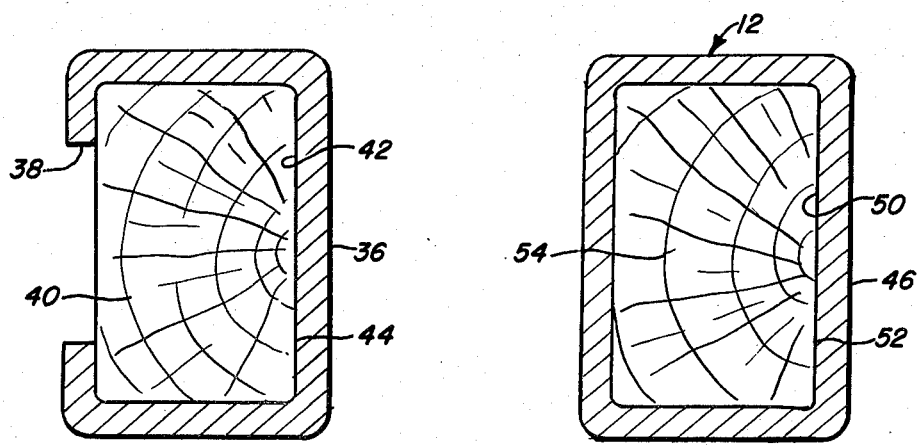
FIG. 6 (on the same page as FIG. 1) is a cross-sectional view of another composite post assembly in accordance with principles of the present invention.
FIG. 9 (on the same page as FIG. 1) is a cross-sectional top view of the composite beam assembly taken substantially along line 9—9 of FIG. 8.

Referring to FIG. 6 it may be desirable, such as for reasons of economy, that the generally tubular metal post of the composite post assembly only partly circumscribe the core-receiving opening 44. In such circumstances, an open-sided metal channel or channel-shaped load-carrying support member 36 can be provided. Structurally, the open sides of the channel 36 define an access opening 38. In order to reinforce the channel 36 an impact-resistant interior hardwood core 40, which is substantially similar to the impact-resistant interior hardwood core 32 shown in FIGS. 3–5, is press fit or otherwise affixed to the channel 36. Preferably, the impact-resistant wooden core 40 spans across and abuttingly engages the interior wall 42 of the channel 36 to substantially block the core-receiving opening 42 and thereby substantially prevents debris from accumulating within the open-sided channel 36.

Figure 8:
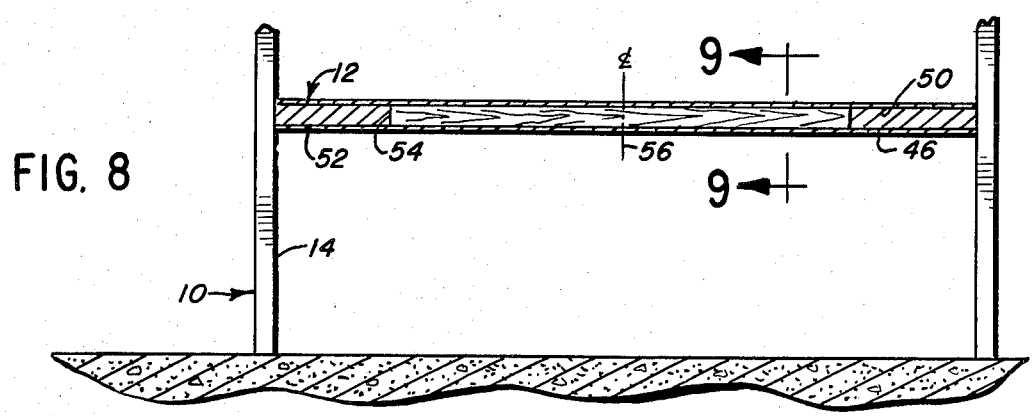
FIG. 8 is a longitudinal cross-sectional view of a composite beam assembly in accordance with principles of the present invention.

Referring now to the horizontal composite beam assembly 12 shown in FIGS. 8 and 9, a generally tubular elongated horizontal beam, support bar or hollow horizontal load-carrying support member 46 has an interior wall 50 which defines a core-receiving opening 52. Beam 46 is made of metal, such as steel. Other types of metal, however, can be used.

In the illustrative embodiment, beam 46 is imperforate and has a rectangular cross-sectional configuration that completely circumscribes and surrounds the core-receiving opening 52. It may be desirable in some circumstances that the beam take the form of an open-sided channel or have some other cross-sectional configuration or shape.

Figure 7:
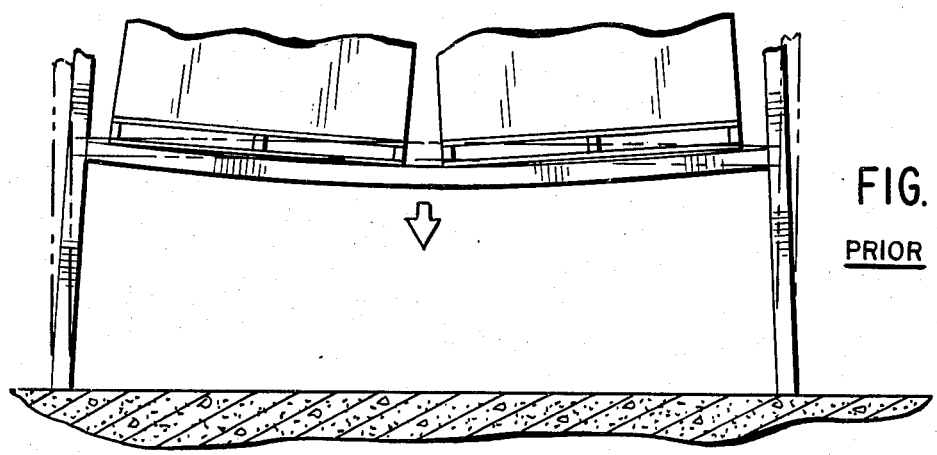
FIG. 7 is a front view of a prior art beam deflected under load.

In order to substantially prevent the beam 46 from excessively deflecting and interfering with the load-carrying capacity and storage space below the beam 46, as occurs in some prior art beams (FIG. 7), a deflection-resistant interior wooden core 54 is disposed within the core-receiving opening 52 of the beam 46. Preferably, the deflection-resistant wooden core 54 is solid and spans entirely across the width of the core-receiving opening 52 so as to intimately engage the interior wall 50 of the beam 46. Desirably, the wooden core 54 is fixedly secured to the interior wall 50 of the beam 46, such as by press fitting the core 54 into the beam 46 or vice versa.

In the embodiment of FIG. 8, the deflection-resistant wooden core 54 extends or spans about two-thirds the length of the beam generally about the vertical center lines 56 of the beam 46. In the preferred embodiment, the deflection-resistant wooden core 54 is selected from the class of hardwoods consisting of oak, elm, gum and tupelo. The deflection-resistant wooden core 54 together with metal beam 46, have a combined strength substantially greater than the strength of the metal beam 46 alone, to substantially resist and limit the deflection and bending of the composite beam assembly 12 under load.

Figure 10:
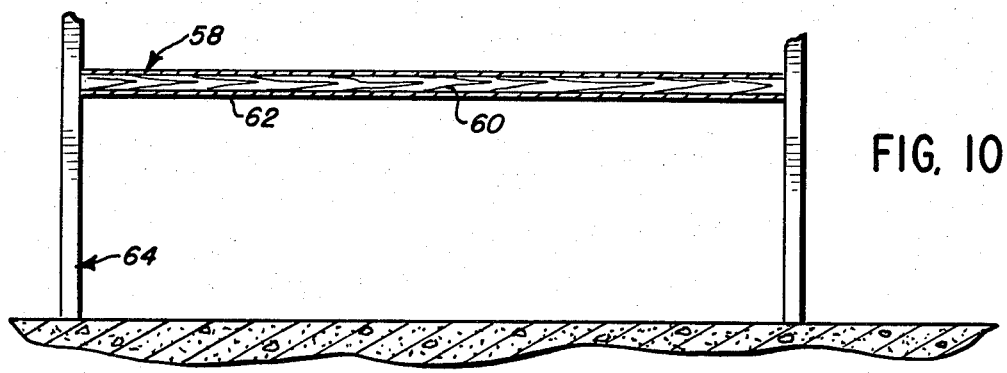
FIG. 10 (on the same page as FIG. 7) is a longitudinal cross-sectional view of another composite beam assembly in accordance with principles of the present invention.
Figure 11:
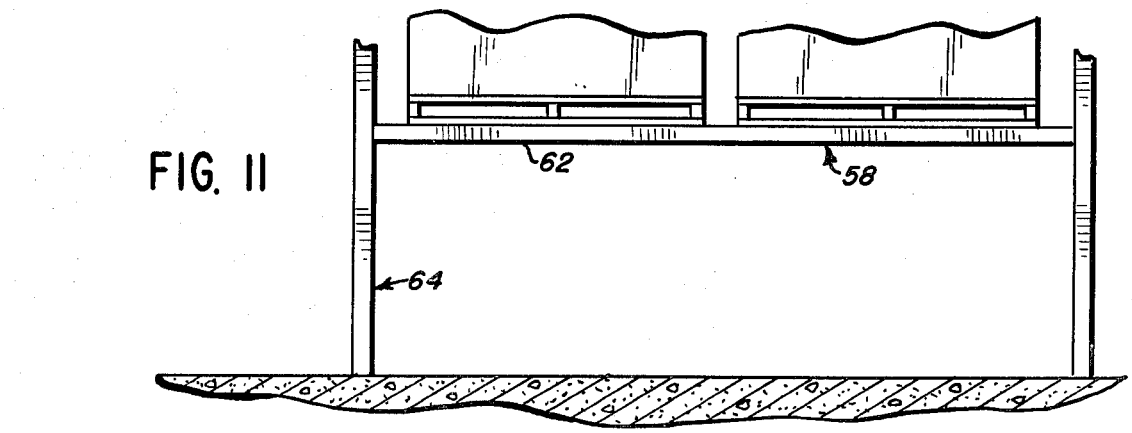
FIG. 11 is a front view of the composite beam assembly of FIG. 11 under load.

The composite beam assembly 58 shown in FIGS. 10 and 11 is substantially the same as the composite beam assembly 12 shown in FIGS. 8 and 9, except that the deflection-resistant solid interior hardwood core 60 extends and spans the entire length of the beam 62. Composite beam assembly 58 is believed to be even stronger than composite beam assembly 12 of FIG. 8, however, it may be desirable to use the composite beam assembly 12 of FIG. 8 instead of composite beam assembly 58 for reasons of economy.

One type of composite beam assembly 58 that can be used with this invention is a 3¼×2¼ inch beam made of 13 gauge steel having a length of about 107½ inches. In such circumstances, the amount of deflection can be limited to about ¼ inch. Of course, composite beam assemblies having other dimensions can be used to reduce potential excessive deflection to some other tolerable amount.

The above detailed description has been given for ease of understanding only. No unnecessary limitations are to be understood therefrom, as modifications will be obvious to those skilled in the art.

What is claimed is:

1. A reinforced storage rack, comprising:
   a plurality of composite generally upright post assemblies spaced from each other in general vertical parallel relationship;
   a plurality of composite generally horizontal beam assemblies spaced from each other in general horizontal parallel relationship;
   connector means for connecting said composite beam assemblies to said composite post assemblies;
   each of said composite post assemblies including a generally upright tubular metal post having an interior wall defining a core-receiving opening;
   each of said composite beam assemblies including an elongated generally horizontal tubular metal support beam having an interior wall defining a core-receiving opening; and
   at least one of said core-receiving openings having an impact and deflection resistant, substantially solid interior wooden core fixedly disposed therein which substantially spans across said core-receiving opening;
   said impact and deflection resistant interior wooden core enhancing the strength and load-carrying capacity of said reinforced storage rack in an amount substantially greater than the strength of the metal support beams and posts alone and providing a reinforced storage rack for substantially resisting forklift impact, bending and excessive deflection under load.

2. A reinforced storage rack in accordance with claim 1 wherein said impact and deflection resistant, solid interior wooden core is securely press-fit into said interior wall that securely receives said impact and deflection resistant interior wooden core.

3. A reinforced storage rack in accordance with claim 1 wherein said impact and deflection resistant, solid interior wooden core consists substantially of hardwood.

4. A reinforced storage rack in accordance with claim 3 wherein said hardwood impact and deflection resistant, solid interior core is selected from the class of hardwoods consisting of oak, elm, gum and tupelo.

5. A composite load-carrying assembly in accordance with claim 1 wherein said tubular support member at least partly circumscribes said core-receiving opening.

6. A reinforced storage rack in accordance with claim 1 wherein said upright tubular metal post includes an open-sided metal channel, and said impact and deflection resistant, solid interior wooden core is snugly disposed within said open-sided metal channel of said reinforced storage rack.

7. A reinforced storage rack in accordance with claim 1 wherein said upright tubular metal post is imperforate and completely circumscribes said core-receiving opening, and said impact and deflection resistant, solid interior wooden core is snugly disposed within said imperforate post of said reinforced storage rack.

8. A reinforced storage rack in accordance with claim 7 wherein:
   said upright metal post has rectangular cross-sectional configuration, and
   said impact and deflection resistant, solid interior wooden core is securely press-fit into said metal post of said reinforced storage rack.

9. A reinforced storage rack in accordance with claim 1 wherein said horizontal tubular metal beam is substantially imperforate, and said impact and deflection resistant, solid interior wooden core is snugly disposed within said beam of said reinforced storage rack.

10. A reinforced storage rack in accordance with claim 9 wherein:
    said horizontal tubular metal beam has rectangular cross-sectional configuration, and
    said impact and deflection resistant, solid interior wooden core abuts against and is press fit into said interior wall of said horizontal tubular metal beam of said reinforced storage rack.

11. A reinforced storage rack in accordance with claim 10 wherein said impact and deflection resistant, solid interior wooden core extends about two-thirds the length of said horizontal tubular metal beam of said reinforced storage rack generally about the vertical center line of said horizontal tubular metal beam.

12. A reinforced storage rack in accordance with claim 10 wherein said impact and deflection resistant, solid interior wooden core extends substantially along the entire length of the horizontal tubular metal beam.

13. A composite load-carrying assembly in accordance with claim 1 wherein said wooden core consists substantially of hardwood.

14. A composite load-carrying assembly in accordance with claim 13 wherein said hardwood core is selected from the class of hardwoods consisting of oak, elm, gum and tupelo.

15. A reinforced storage rack, comprising:
    a plurality of composite upright post assemblies;
    a plurality of composite generally horizontal beam assemblies;
    connector means for connecting said composite beam assemblies to said composite post assemblies;
    each of said composite post assemblies including
       a generally tubular elongated metal post having an interior wall defining a core-receiving opening, and an impact-resistant interior hardwood core disposed within and substantially spanning across said core-receiving opening, said impact-resistant hardwood core extending from a position in proximity to the ground to a position above one of said composite beam assemblies, said impact-resistant hardwood core being fixedly secured to said interior wall and cooperating with said post for substantially resisting forklift impact and bending; and each of said composite beam assemblies including a generally tubular elongated metal beam having an interior wall defining a core-receiving opening, and a deflection-resistant interior hardwood core disposed within and substantially spanning across said core-receiving opening of said beam, said deflection-resistant hardwood core extending at least two-thirds the length of said beam and fixedly secured to the beam's interior wall for substantially preventing the beam from deflecting excessively under load and interfering with the load-carrying capacity of the storage space below said beam.

16. A reinforced storage rack in accordance with claim 15 wherein:

said post is imperforate and has a rectangular cross-sectional configuration, and said impact-resistant core is press fit into said post, and said beam is imperforate and has a rectangular cross-sectional configuration, and said deflection-resistant core is press fit into said beam.

17. A reinforced storage rack in accordance with claim 15 wherein said impact-resistant core and said deflection-resistant core are each selected from the class of hardwoods consisting of oak, elm, gum and tupelo.

18. A reinforced storage rack in accordance with claim 15 wherein said deflection-resistant core extends substantially along the entire length of the beam.

* * * * *